(12) United States Patent
Wang et al.

(10) Patent No.: US 11,644,153 B2
(45) Date of Patent: May 9, 2023

(54) SYSTEMS AND METHODS OF USE OF CARBON-BASED PELLETS IN ADSORBED NATURAL GAS FACILITY

(71) Applicant: Saudi Arabian Oil Company, Dhahran (SA)

(72) Inventors: Yuguo Wang, Dhahran (SA); Rashid Othman, Dhahran (SA); Richard Gunther, Dhahran (SA); Ahmed Aman, Dhahran (SA)

(73) Assignee: SAUDI ARABIAN OIL COMPANY

( * ) Notice: Subject to any disclaimer, the term of this patent is extended or adjusted under 35 U.S.C. 154(b) by 714 days.

(21) Appl. No.: 16/678,638

(22) Filed: Nov. 8, 2019

(65) Prior Publication Data
US 2020/0292133 A1    Sep. 17, 2020

Related U.S. Application Data

(60) Provisional application No. 62/816,706, filed on Mar. 11, 2019.

(51) Int. Cl.
*B01J 20/20*    (2006.01)
*F17C 11/00*    (2006.01)
*B01J 20/28*    (2006.01)

(52) U.S. Cl.
CPC ............ *F17C 11/007* (2013.01); *B01J 20/20* (2013.01); *B01J 20/2808* (2013.01); *B01J 20/28011* (2013.01); *B01J 20/28016* (2013.01); *B01J 20/28066* (2013.01); *B01J 20/28073* (2013.01); *F17C 2221/033* (2013.01); *F17C 2227/0157* (2013.01); *F17C 2227/0302* (2013.01)

(58) Field of Classification Search
None
See application file for complete search history.

(56) References Cited

U.S. PATENT DOCUMENTS

| | | | |
|---|---|---|---|
| 5,094,736 A | 3/1992 | Greenbank | |
| 6,613,126 B2 | 9/2003 | Tange et al. | |
| 7,574,996 B2 | 8/2009 | Hasenauer et al. | |
| 9,067,848 B2 | 6/2015 | Stadie et al. | |

(Continued)

FOREIGN PATENT DOCUMENTS

| | | |
|---|---|---|
| CN | 105605422 A | 5/2016 |
| WO | 0193985 A1 | 12/2001 |

(Continued)

OTHER PUBLICATIONS

U.S. Appl. No. 16/591,907, "Mobile Natural Gas Storage and Transportation Unit Based on Adsorption", filed Oct. 3, 2019.

(Continued)

*Primary Examiner* — Sharon Pregler
(74) *Attorney, Agent, or Firm* — Bracewell LLP; Constance Gall Rhebergen

(57) ABSTRACT

Natural gas storage units and methods for reducing effects of fluctuating demand on natural gas, a natural gas storage facility including an adsorbed natural gas storage unit containing carbon-based adsorbents; a temperature control system coupled to the adsorbed natural gas storage unit to regulate temperature of the adsorbed natural gas storage unit; and a compressor system coupled to the adsorbed natural gas storage unit to regulate pressure of the adsorbed natural gas storage unit.

10 Claims, 5 Drawing Sheets

(56) References Cited

U.S. PATENT DOCUMENTS

| | | |
|---|---|---|
| 9,188,284 B2 | 11/2015 | Luo et al. |
| 9,249,933 B2 | 2/2016 | Morales et al. |
| 9,562,649 B2 | 2/2017 | Wang et al. |
| 10,018,306 B2 | 7/2018 | Fanger et al. |
| 10,302,254 B2 | 5/2019 | Wang et al. |
| 2010/0133280 A1 | 6/2010 | Stein et al. |
| 2014/0274659 A1* | 9/2014 | Romanos ............. B01J 20/3078 502/56 |

FOREIGN PATENT DOCUMENTS

| | | |
|---|---|---|
| WO | 2011159259 A1 | 12/2011 |
| WO | 2013130401 A1 | 9/2013 |

OTHER PUBLICATIONS

International Search Report and Written Opinion for related PCT application PCT/US2020/022112 dated Jun. 24, 2020.

\* cited by examiner

SYSTEMS AND METHODS OF USE OF CARBON-BASED PELLETS IN ADSORBED NATURAL GAS FACILITY

PRIORITY

The present application is a non-provisional application of and claims priority to and the benefit of U.S. Prov. App. No. 62/816,706, filed Mar. 11, 2019, the entire disclosure of which is incorporated here by reference.

TECHNICAL FIELD

The disclosure relates to methods and systems of using carbon-based adsorbents for storage and transport of gas, specifically natural gas.

BACKGROUND

Peak shaving and load leveling are both energy management processes in an electricity consumption system. In both processes, electrical energy is stored when the demand for electricity is low, and the stored energy is released when the demand for electricity on the grid is high. During the peak shaving process, the stored electrical energy is released to the grid to remove only the peak of the load profile on the system. During load leveling, the same process takes place except the goal is to eliminate the peaks and valleys in the load profile. Electrical energy is stored when load is low and discharged when load is high.

Similar to an electrical network, peak shaving and load leveling processes can be implemented in a natural gas transportation network that uses adsorbed natural gas storage (ANG). An ANG facility stores the gas during low demand times and discharges the gas during a high demand period. An ANG facility can be used either for peak shaving or load leveling. Adsorbed natural gas technology uses a highly porous adsorbent material to store natural gas molecules at pressures less than 650 pound per square inch (psi) as compared to compressed natural gas technology where gas is stored at 3000 psi or greater pressures. Activated carbons are commonly used adsorbents in adsorbed natural gas storage (ANG) applications. But, they have significant limitations.

Activated carbons are produced by chemically burning out nonporous carbon precursors in a controlled manner. Activated carbons with mesopores and macropores have low packing densities of 0.2 to 0.5 grams per cubic centimeter ($gcm^{-3}$). Mesopores in adsorbents for ANG applications have a pore diameter greater than 2 nanometers (nm) and less than 50 nm, while macropores in these adsorbents have a pore diameter greater than 50 nm. Micropores in adsorbents for ANG applications have a pore diameter less than 2 nm. Activated carbons are mainly with micropores and exhibit slow adsorption/desorption kinetic behavior due to the slow mass transport. The slow mass transport can be attributed to the large presence of micropores with narrow pore diameters and dead-end pore connectivity. Rational and systematic design of carbon pore structure in the activated carbons has not been possible due to mechanistic reasons.

SUMMARY

To overcome the aforementioned problems of conventional activated carbon adsorbents, compositions of zeolite-templated carbon pellets were developed. Embodiments also include ANG systems that utilize these compositions to manage the demands for natural gas by peak shaving and load leveling processes. Certain embodiments include a natural gas storage unit for reducing effects of fluctuating demand on natural gas. In an embodiment, the natural gas storage facility includes an adsorbed natural gas storage unit containing carbon-based adsorbents, a temperature control system coupled to the adsorbed natural gas storage unit to regulate temperature of the adsorbed natural gas storage unit, and a compressor system coupled to the adsorbed natural gas storage unit to regulate pressure of the adsorbed natural gas storage unit. The carbon-based adsorbent in the natural gas storage unit can be granular activated carbon. The carbon-based adsorbent in the natural gas storage unit can be pelletized activated carbon. The carbon-based adsorbent in the natural gas storage unit can be pelletized zeolite templated carbon. The carbon-based adsorbent in the natural gas storage unit can be polyvinyl alcohol-bonded pellets of zeolite templated carbon.

Certain embodiments include a gas storage apparatus to transport the gas. In an embodiment, the gas storage apparatus contains an adsorbent composition containing zeolite templated carbon pellets. The adsorbent composition can be polyvinyl alcohol-bonded pellets of zeolite templated carbon. The adsorbent composition can be polyvinyl alcohol-bonded pellet of the zeolite templated carbon with a pellet density greater than 0.6 grams per cubic centimeters and mechanical compressive strength greater than 10 megapascals. The gas storage apparatus can transport methane or natural gas.

Numerous other aspects, features, and benefits of the present disclosure may be made apparent from the following detailed description taken together with the drawings. The methods and compositions can include other steps or different components depending on desired goals.

BRIEF DESCRIPTION OF THE DRAWINGS

Embodiments will be readily understood by the following detailed description in conjunction with the accompanying drawings. Embodiments are illustrated by way of example and not by way of limitation in the accompanying drawings, as the disclosure may include other effective embodiments as well.

DETAILED DESCRIPTION

The disclosure describes various pelletized zeolite-templated carbon compositions and systems using these compositions for storing natural gases. In the following description, numerous details are set forth in order to provide a thorough understanding of the various embodiments. In other instances, well-known processes, devices, and systems may not been described in particular detail in order to not unnecessarily obscure the various embodiments. Additionally, illustrations of the various embodiments may omit certain features or details in order to not obscure the various embodiments.

In the following detailed description, reference is made to the accompanying drawings that form a part of this disclosure. The drawings provide an illustration of some of the various embodiments in which the subject matter of the present disclosure may be practiced. Other embodiments may be utilized, and logical changes may be made without departing from the scope of this disclosure. The description may use the phrases "in certain embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous. The verb "couple" and its conjugated forms means to complete any type of required junction, including electrical, mechanical or fluid, to form a singular object from two or more previously non-joined objects. If a first device couples to a second device, the connection can occur either directly or through a common connector. "Optionally" and its various forms means that the subsequently described event or circumstance may or may not occur. The description includes instances where the event or circumstance occurs and instances where it does not occur. "Operable" and its various forms means fit for its proper functioning and able to be used for its intended use. "Associated" and its various forms means something connected with something else because they occur together or that one produces the other. The term "pellet" is used to describe a binder-bonded body of zeolite-templated carbon composition and is not intended to limit the size or shape of such bodies.

Certain embodiments include a gas storage apparatus to transport the gas. In an embodiment, the gas storage apparatus contains an adsorbent composition containing zeolite templated carbon pellets. The adsorbent composition can be polyvinyl alcohol-bonded pellets of zeolite templated carbon. The adsorbent composition can be polyvinyl alcohol-bonded pellet of the zeolite templated carbon with a pellet density greater than 0.6 grams per cubic centimeters and mechanical compressive strength greater than 10 megapascals. The gas storage apparatus can transport methane or natural gas.

Figure 7:
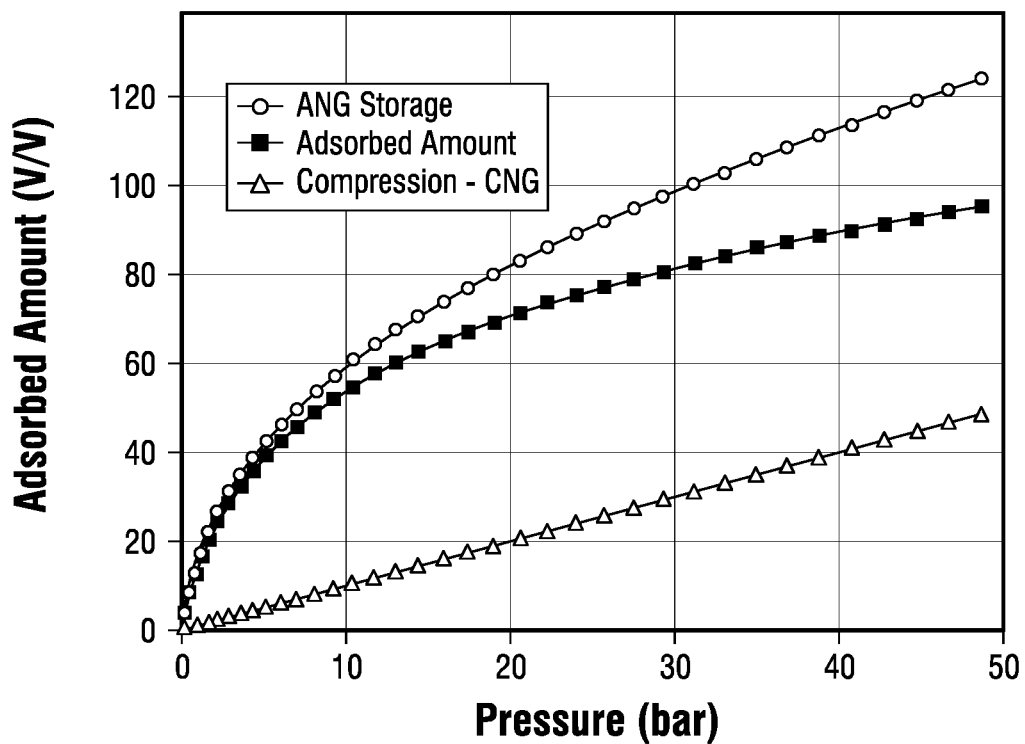
FIG. 7 is a graphical representation of the stored amount by adsorption (ANG amount) and storage by only compression (CNG amount) without adsorbent, according to an embodiment.

Natural gas, which primarily consists of methane, is a valuable alternative fuel with two major advantages, in comparison with gasoline, namely, low cost and clean-burning characteristics. Methane is inexpensive and available in abundance worldwide. In addition, low emission levels of ozone, unburned hydrocarbon, and oxides of sulfur and nitrogen are observed using natural gas. The greenhouse effect is much less than that of classical liquid hydrocarbon fuels. Finally, methane has the highest hydrogen-to-carbon (H/C) ratio and, consequently, the greatest energy per unit mass of all hydrocarbon molecules. However, methane is supercritical at room temperature and ambient atmosphere. It has a critical temperature (Tc) of 190.6 Kelvin and a critical pressure (Pc) of 45.8 atmospheric pressure (atm). Therefore, methane cannot be liquefied by compression above Tc. Thus, storage of the greatest amounts of methane in a given limited volume is a real challenge for its application to both gas transportation and gas-powered vehicles. For gas-powered vehicles, gas storage requires, as much as possible, light, small and diversely shaped tanks. An ANG unit with carbon pellets to enhance the storage capacity can be used to replace the current CNG (compressed natural gas) tank, usually a cylindrical vessel. The ANG unit operates at a lower pressure and is capable of storing the same amount of natural gas, for example, as shown in FIG. 7. The ANG vessel is filled with adsorbent materials that adsorb natural gas and store natural gas at similar or greater energy density than CNG. Therefore, the vehicles can be refueled from the natural gas network without extra gas compression. The size of the fuel tanks can be decreased and the fuel tanks can be made of lighter materials. As shown by way of example in FIG. 3, at about 40 bars, the gas stored in an ANG tank can be the same as that stored in a CNG tank at the pressure of about 150 bars.

CNG requires thick and heavy vessels, generally spherical or cylindrical, and is therefore not practical for automotive applications. In addition, compressing the gas to the required pressure is an expensive process. The liquefaction of methane increases its specific weight and, hence, its energy density, but requires very low temperatures, because its boiling point is 111.2 K. On the other hand, the production of methane hydrates is difficult and still requires low temperatures (close to 273 Kelvin) and high pressures (higher than 35-40 bar), and the preservation of such metastable compounds is challenging. Therefore, storing methane via adsorption in porous materials was developed because adsorption requires lower pressures than the pressure required for compressed natural gas and may be achieved at room temperature, unlike liquefaction.

When the available surface of the adsorbent increases, the number of adsorbed molecules increases at fixed pressure and temperature. Thus, porous solids are efficient materials for gas storage by adsorption, as these solids have the large specific surface areas. The size of the pores are important for adsorption of a supercritical gas. Such gas adsorbs in the form of low-density monolayers, in which the molecules are in permanent agitation. Therefore, adsorption predominantly occurs within the pores that can create a sufficiently high attractive potential, such as when the pore walls are so close to each other that their own potential fields overlap. Thus, the corresponding pores are very narrow with widths that are typically less than four times the molecular diameter of the considered adsorbate. With regards to methane, numerical simulations have shown that the maximum density of the adsorbed phase is attained within pores that are 1.12-1.14 nm wide. With such an optimal width, two facing methane monolayers may be inserted between pore walls. It should be emphasized that, because of the thermal agitation within the supercritical adsorbed phase, the thickness of a monolayer at 298 Kelvin is greater than the van der Waals diameter of methane. Indeed, if methane is assumed to behave like a spherical molecule, its diameter is 0.381 nm. Hence, pores that have widths of less than about 1 nm can accommodate only one monolayer, whereas those pores that are narrower than about 0.4 nm cannot store methane at all. The attractive potential created by the facing pore walls decreases very rapidly with increasing width, such that it becomes almost a simple isolated surface for width greater than 3-4 nm. Consequently, in such "wide" pores, methane is poorly adsorbed, and its density is similar to that of the gas phase in equilibrium with it.

The highest adsorption capacities are reached with materials with the greatest number of pores of the relevant width. In addition, slit-shaped pores were shown, from numerical simulations, to lead to greater volumetric methane storage than any other geometry. In activated carbons, micropores are slit-shaped wherein the definitions of both the physical pore width (W) and the really accessible inner space (w) are specified. The parameter w is usually measured through the adsorption of various probe molecules (such as $CO_2$ near room temperature or $N_2$ at 77 K) and is given by the relation w=W−2rc, where rc is the radius of a carbon atom and is assumed to be a half of the normal separation of planes of graphite, which is 0.17 nm. Hence, the optimal pore width (W≈1.14 nm) corresponds to an ideal inner pore size of w≈0.8 nm. At this value of w, the adsorbed phase has the highest density at 3.5 MPa. Compositions with pores of average widths of 1.5 and 2.5 nm were developed for optimized charge and discharge steps. Micropores of suitable widths are required to obtain the highest methane uptakes along with a small fraction of wider pores that are necessary for heat and mass transfer throughout the adsorbent bed. It was calculated that a hypothetical monolithic adsorbent, only consisting of parallel carbon layers that form micropores with the optimal width, would be able to store a theoretical maximum of 28 mol of methane per kilogram of material at 3.5 MPa and room temperature. However, because such a non-physical adsorbent is free of voids, allowing the diffusion of the gas toward the microporosity, and that an ideal affinity between the adsorbed phase and the carbon surface was assumed in the calculation, real storage capacities are expected to be much lower.

Embodiments include methods of zeolite-templated synthesis of microporous carbons. In an embodiment, microporous zeolite is used as a sacrificial template and organic molecules such as propylene are carbonized inside the zeolite micropores. After carbon deposition, zeolite framework is removed by acid dissolution to generate highly microporous carbon replica. In certain embodiments, the zeolite-templated carbon (ZTC) materials do not undergo any processing before being subject to pelletization. The ZTC materials are directly mixed with the binder to start the pelleting process, after the acid dissolution step. The zeolite-templated carbons exhibit a surface area up to 3000 square millimeters per gram ($m^2$/g). Due to the ordered and well-defined microporous structure, micropore size distribution is narrow. Pore size and pore connectivity can be tailored by choosing the zeolite templates with different structures and/or by changing chemical vapor deposition (CVD) conditions. Regular three-dimensional pore connectivity can lead to enhanced mass transport at the same pore diameter. In addition to the pore structure, particle morphology of pelletized zeolite-templated carbon compositions can be controlled, because the zeolite crystal morphology is faithfully transcribed to the carbon morphology. The pelletized zeolite-templated carbon compositions can be synthesized in various morphologies and particle sizes, depending on the synthesis conditions. Uniform particle size of carbon materials would induce the close packing of carbon particles, and hence, achieve tight packing density. If compacted zeolite pellets are used as templates to prepare pelletized zeolite templated carbons, the pore morphology and dimensions cannot be maintained during acid etching step to remove the zeolite framework.

Disclosed here are methods of producing an adsorbent composition containing pelletized zeolite-templated carbon compositions. One such method includes the steps of forming an aqueous mixture containing a binder, water, and zeolite-templated carbon, and subjecting the aqueous mixture to a drying process to remove the water and form a dry mixture of the binder and the zeolite-templated carbon. The method further includes compacting the dry mixture of the binder and the zeolite-templated carbon to form an adsorbent composition. The adsorbent composition is a binder-bonded pellet of the zeolite templated carbon. In certain embodiments, the binder is present at 5 weight percent of the aqueous mixture and the zeolite-templated carbon is present at 10 weight percent of the aqueous mixture. The step of subjecting the aqueous mixture to a drying process can be performed at 373 Kelvin. The step of compacting the dry mixture of the binder and the zeolite-templated carbon can be performed at a pressure ranging from 100 to 350 megapascals and at a temperature ranging from 400 to 550 Kelvin. In an embodiment, the step of compacting the dry mixture of the binder and the zeolite-templated carbon can be performed at a pressure of 150 megapascals or at 300 megapascals. In an embodiment, the step of compacting the dry mixture of the binder and the zeolite-templated carbon can be performed at a temperature ranging from 423 to 523 Kelvin, or alternatively at a temperature of 473 Kelvin. In some of the embodiments of the methods of making the pelletized zeolite-templated carbon compositions, the binder used is polyvinyl alcohol.

The nomenclature used in this disclosure provides the weight percent of the binder used to make the carbon pellets, along with the temperature and pressure applied to make the carbon pellets. The pelletized samples were denoted as 'ZTC-x wt-y K-z MPa', where x is wt % of PVA, y is the heating temperature, and z is the pelletizing pressure. For example, ZTC-5 wt-473K-150 MPa indicates that this sample was prepared by pelletizing 5 wt % PVA/ZTC mixture under 150 MPa and 473 K.

Several embodiments of the pelletization methods utilize polyvinyl alcohol (PVA) as the binder. PVA was selected as one of the operative binders, because of the suitable melting point for hot-pressing conditions (below 200 degrees Celsius (° C.)), its adhesive properties, and tensile strength. PVA is a water-soluble atactic polymer with chemical formula: $[CH_2CH(OH)]_n$. An example PVA formulation for use here is polyvinyl alcohol from Sigma-Aldrich (operating as MilliporeSigma, headquartered in St. Louis, Mo., USA), which has a molecular weight distribution of 85,000-124,000 grams per mole (g/mol) and is 99% hydrolyzed. Other possible binders include adhesive cellulose-based binders, novolac phenolic resins (such as Georgia-Pacific 5506®, available from Georgia-Pacific Chemicals, headquartered in Atlanta, Ga.) or polytetrafluoroethylene resins (such as Teflon®, available from The Chemours Company, headquartered in Wilmington, Del., USA). In other embodiments, bentonite clay and cellulose fibers can function as binders in the pelletized zeolite-templated carbon compositions.

Embodiments include pelletized zeolite-templated carbon compositions with appropriate density and mechanical strength for natural gas storage. These pelletized zeolite-templated carbon compositions have higher bulk density and mechanical strength for natural gas storage than the ZTC powder compositions. In certain embodiments, the bulk density of the pelletized zeolite-templated carbon composition ranges from 0.6 grams per cubic centimeter ($gcm^{-3}$) to 1.5 $gcm^{-3}$. In certain embodiments, the bulk density of the pelletized zeolite-templated carbon composition ranges from 0.8 grams per cubic centimeter ($gcm^{-3}$) to 1.0 $gcm^{-3}$. In certain embodiments, the volumetric methane adsorption capacity of the pelletized zeolite-templated carbon composition for methane measured at a temperature of 298K and pressure of 40 bars ranges from 120 v/v to 200 v/v. In certain embodiments, the pelletized zeolite-templated carbon composition has a mechanical strength of 10 to 60 MPa. The pelletized zeolite-templated carbon composition is well-suited for packed-bed gas adsorption processes. The ANG unit in gas-powered vehicles can have the same density and mechanical strength requirement of the pelletized zeolite-templated carbon Certain embodiments include a natural gas storage unit for reducing effects of fluctuating demand on natural gas. In an embodiment, the natural gas storage facility includes an adsorbed natural gas storage unit containing carbon-based adsorbents, a temperature control system coupled to the adsorbed natural gas storage unit to regulate temperature of the adsorbed natural gas storage unit, and a compressor system coupled to the adsorbed natural gas storage unit to regulate pressure of the adsorbed natural gas storage unit. The carbon-based adsorbent in the natural gas storage unit can be granular activated carbon. The carbon-based adsorbent in the natural gas storage unit can be pelletized activated carbon. The carbon-based adsorbent in the natural gas storage unit can be pelletized zeolite templated carbon. The carbon-based adsorbent in the natural gas storage unit can be polyvinyl alcohol-bonded pellets of zeolite templated carbon.

In an embodiment, an adsorbed natural gas (ANG) storage system is coupled to a natural gas pipeline. In certain embodiments, the ANG storage system is located close to a natural gas power plant, and the ANG storage system can be located after a filtration and metering station. In an embodiment, the ANG facility receives and stores natural gas from a connection point upstream of a pressure control valve and discharges natural gas back to the gas grid at a point downstream of the pressure control valve to minimize the compression cost. When this ANG system is applied to peak shaving, it can serve the demand side by storing gas at low demand time. And the stored natural gas can be used at high demand time to replace liquid hydrocarbons for switchable (switch between natural gas and light crude or diesel) power generation plants to create savings due to the price difference of liquid hydrocarbon and natural gas of equivalent heating value. In certain embodiments, during times of low demand, there is sufficient natural gas that is supplied to the power generation plant, but at times of high demand, the gas delivered to the power plant is insufficient and the ANG facility is brought online to manage the demand.

In an embodiment, the ANG storage system is part of the load leveling process and serves the supply side by allowing the natural transportation network operator to compress and transport natural gas at constant pressure and flow rate to eliminate pressure variation and reduce the cost of compressing. In certain embodiments, there is always enough gas supplied to the power plant but extra gas is stored in the ANG storage system at the facility during times of low demand and at times of high demand, the gas is released to the power plant.

Figure 1:
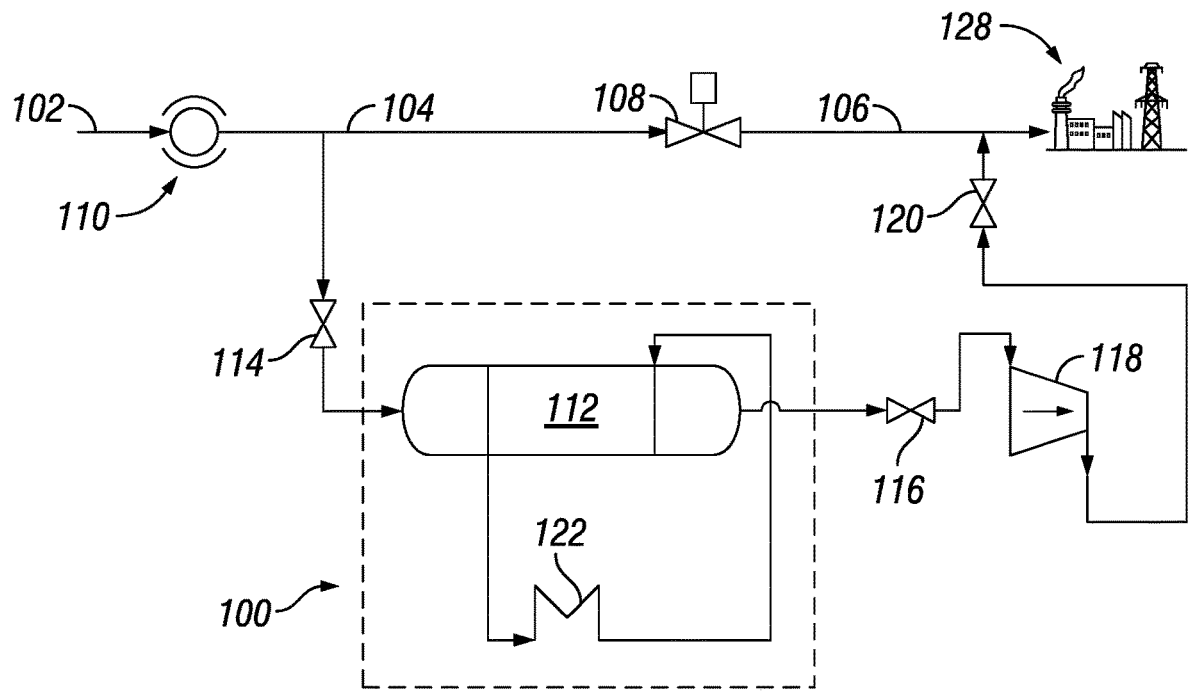
FIG. 1 is an illustration of a natural gas supply and utilization system that includes an ANG unit, according to an embodiment.

As shown in FIG. 1, an ANG storage facility 100 is coupled to natural gas pipeline 102 at an upstream connection point 104 and downstream connection point 106. Pressure control valve 108 operates in coordination with upstream isolation valve 114 and downstream isolation valve 120 to fluidly isolate or integrate the ANG storage unit 100 from the natural gas pipeline 102 upon closing. The ANG storage facility 100 is connected to and receives the natural gas from a pipeline location, which is downstream of a filtration and metering station 110 and, upstream of a pressure control valve 108 and delivers natural gas back to the pipeline for use in the power plant 128. The ANG storage facility 100 includes an ANG storage unit 112. In an embodiment, the ANG storage unit 112 can be made of an array of adsorbers, which are vessels that are filled with carbon-based adsorbents. The ANG storage facility 100 further includes a temperature control system 122. Temperature control system 122 controls, maintains and modifies the internal temperature of ANG storage unit 112. In an embodiment, temperature control system 122 maintains the temperature of the ANG storage unit 112 by introducing temperature-modifying fluids into a thermal jacket surrounding the ANG storage unit 112. Heat transfers to and from the temperature-modifying fluid in the thermal jacket to support the retention and release of the natural gas from the carbon-based adsorbents in the ANG storage unit 112. The ANG storage unit 112 is coupled to a compressor system to regulate pressure of the unit. The ANG storage unit can operate at an adsorption pressure of up to 850 to 900 psig, and a desorption pressure of one atmospheric pressure or sub-atmospheric pressure. The ANG storage unit also preferably operates at the temperature range of 20 to 30° C.

The facility utilizes the diurnal pressure and temperature swing in the pipeline for adsorption and desorption assisted by the cooling and heating provided by the temperature control system 122. The temperature control system 122 can be powered by energy from the nearby power plant or solar energy. At night or at times when the gas demand from the power plant 128 is low and the pressure in the gas grid is high, the storage vessels are charged with the gas by adsorption assisted by high gas pressure and low temperature of the adsorbent bed. The heat of adsorption is neutralized by the cooling unit and the adsorbent bed is kept cool. During the day, the gas demand from the power plant is high, gas is desorbed and released into the power plant. To accelerate the release of gas from the adsorbent bed, heating may be applied to these beds from heating unit. To fully utilize the adsorption capacity of the adsorbent materials, one or sub-atmospheric pressure may be applied to discharge the gas and a compressor may be needed to re-compress the gas to the power plant inlet pressure.

In FIG. 1, the ANG system is connected to the greater pressure side of the pipeline, which is before the pressure control valve 108 and after the metering and filtration station 110 through a receiving valve 114. Natural gas flows through the receiving valve 114 into the ANG system 112 during charging with releasing valve 116 closed. When the pressure inside the ANG system reaches equilibrium with the pressure of pipeline on the higher-pressure side, charging is finished by closing the receiving valve 114. During discharging, releasing valve 116 is open, natural gas flows out of the ANG system due to pressure difference between the ANG system and that of the lower pressure side of the pipeline, which is downstream of the pressure control valve 108. Natural gas flows through delivery valve and further into the power plant 128. When necessary, the released natural gas is regulated by a pressure releasing valve 120 and a compressor 118 to compress the natural gas to the required pressure of the power plant 128.

EXAMPLE 1

Storage Capacity for the ANG Facility Applied to Peak Shaving

The feed rate of natural gas to the power plants causes supply pressure changes in the natural gas pipeline, which corresponds to the diurnal supply change of natural gas. In the summer time, there is a significant difference of flow rate between high demand time (4-6 PM) with a value of 1700 MMSCFD (million standard cubic feet per day) and low demand time with a value of about 300 MMSCFD, and the extra gas amount required is 116 MMSCF (million standard cubic feet) [(1700−300)×2/24]. In the winter time, the extra gas amount required at high demand time is about 114 MMSCF [(750−200)×5/24], therefore, a storage capacity of 150 MMSCF is enough assuming the facility's depth of discharge is 80% for peak shaving.

The flow of the natural gas feed rate for a power plant at different times during a day is described by the following function in Equation 1 and the load leveling flow rate is derived by using Equation 2. The flow rate q(t) for load leveling is constantly equal to 9.08 MMSCFD during the 24-hour period. The storage factor (S) is defined as sum of the largest area below the load leveling line and the largest area above the load level line divided by the total flow amount in the 24-hour period as in Equation 3.

(Equation 1)
$$F1(t) = 2 + 16.99 e^{-0.1536(-19.99+t)^2} + 12.33 e^{-0.1878(-13.52+t)^2} + 8.29 e^{-0.3242(-10+t)^2} + 6.63 e^{-0.4318(-6.899+t)^2}$$

(Equation 2)
$$q(t) = \frac{1}{24} \times \int_0^{24} F1(t) dt$$

(Equation 3)
$$S(\text{storage factor}) =$$
$$\frac{\text{largest area below load leveling} + \text{largest area above load leveling}}{\text{total flow amount during the period}} =$$
$$\frac{\text{Area 1} + \text{Area 2}}{\int_0^{24} F1(t) dt} = \frac{\text{Storage Capacity}}{\int_0^{24} F1(t) dt}$$

Using Equations 1 to 3, the storage factor (S) is calculated to have a value of 32%, and load leveling flow rate is 9.08 MMSCFD, the storage capacity needed for load leveling is 2.9 MMSCF. With regards to methane, numerical simulations have shown that the maximum density of the adsorbed phase is attained within slit pores 1.12-1.14 nm wide.

EXAMPLE 2

Characterization of Carbon Compositions

A commercial activated carbon (Maxsorb) adsorbent was obtained from Kansai Coke & Chemicals Co. Ltd, and its properties are provided in Table 1. The commercial activated carbon (Maxsorb) was obtained as pellet.

TABLE 1

| Form | Powder |
|---|---|
| Density | 0.156 gm/cm³ (apparent) |
| Volume Per Gram | 0.201 cm³/g |
| BET surface area | 3240 m²/g |

The pore size distribution of the carbon compositions was analyzed, as pore size distribution is an important characteristic for evaluating materials suitable for gas storage applications. One of the prevalent methods for determining microscopic pore size distribution is using indirect molecular adsorption methods such as nonlocal density functional theory (NLDFT) and $N_2$ isotherms at 77 K. The nitrogen adsorption-desorption isotherms are a plot of the relative pressure against the adsorbed volume obtained by measuring the amount of $N_2$ gas that adsorbs onto the surface of interest, and the subsequent amount that desorbs at a constant temperature.

Figure 2A:
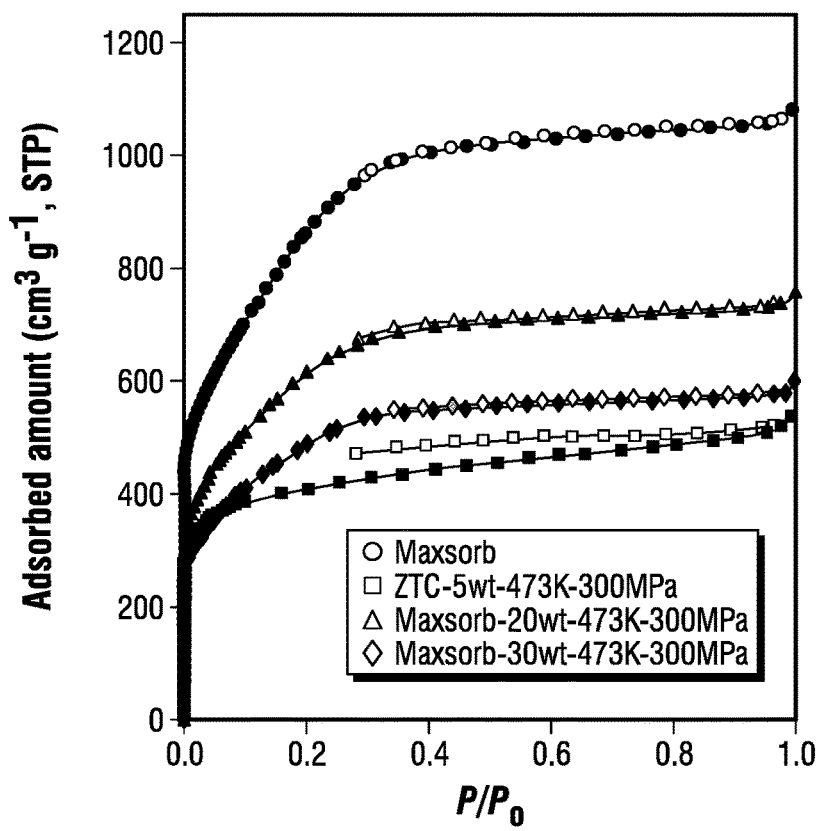
FIG. 2A is a graphical representation of the nitrogen adsorption-desorption isotherms of different carbon compositions that were prepared at different polyvinyl alcohol (PVA) loading concentrations, as compared to the commercial activated carbon (Maxsorb), according to an embodiment.
Figure 2B:
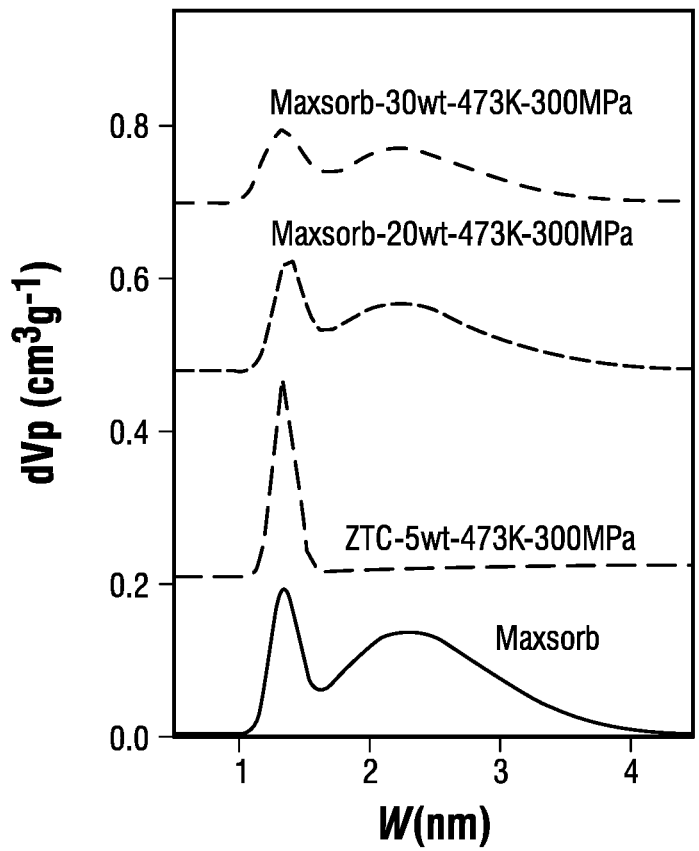
FIG. 2B is a graphical representation of pore size distribution of different carbon compositions that were prepared at different polyvinyl alcohol (PVA) loading concentrations, as compared to the commercial activated carbon (Maxsorb), according to an embodiment.

FIG. 2A is a graphical representation of the nitrogen adsorption-desorption isotherms, and FIG. 2B is a graphical representation of the pore size distribution (NLDFT algorithms) of super-activated carbon (Maxsorb) pellets and pelletized zeolite templated carbon (ZTC) compositions. Clearly, the original and pelletized Maxsorb activated carbons all have a bimodal pore size distribution with both micropore and mesopores, while the pelletized zeolite templated carbon (ZTC) only has micropores at around 13 Å, which is very close to the optimized pore wide of 11.2-11.4 Å.

Figure 3:
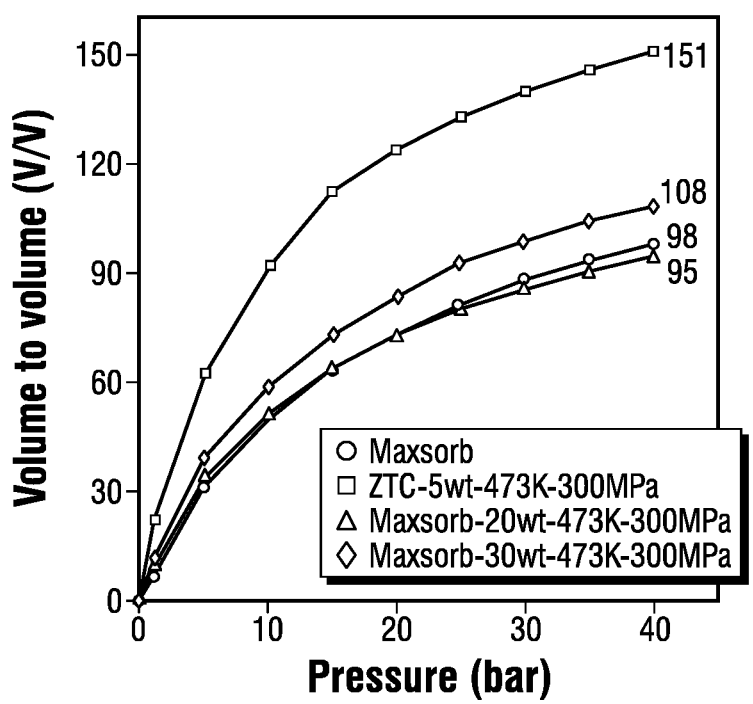
FIG. 3 is a graphical representation of the methane adsorption isotherms of super-activated carbon (Maxsorb) pellets and zeolite-templated carbon compositions at 298 K on volumetric basis, according to an embodiment.

FIG. 3 is a graphical representation of the methane adsorption isotherms of super-activated carbon (Maxsorb) pellets at 298 K on volumetric basis. The optimized pore can adsorb methane at higher density, and as shown in FIG. 3, the volume to volume storage capacity of ZTC-5 wt-473K-300 MPa is about 151 at about 40 bars. While by compression, the amount of methane stored at 40 bars is about 40 times the amount of gas, which means that compression has a volume to volume storage capacity of 40. Therefore, ANG can save the cost of compression, reduce the wall thickness of vessels, and reduce the cost of making the vessel for the same amount of gas stored.

EXAMPLE 3

Commercial Granular Activated Carbon for Methane Storage

Figure 4:
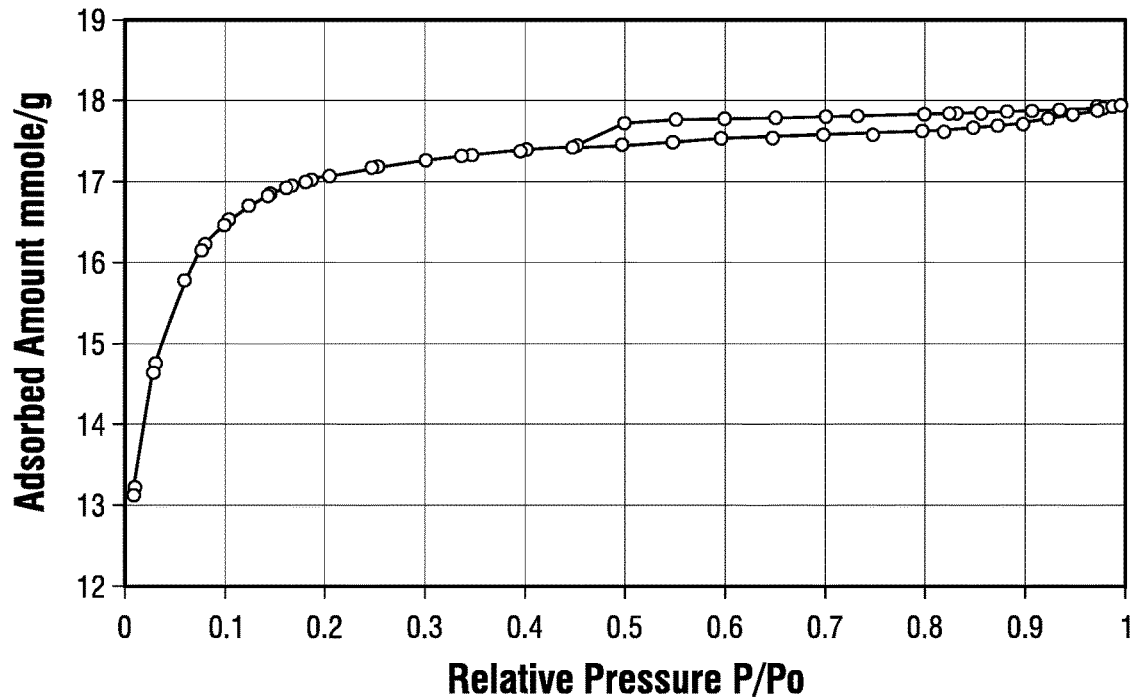
FIG. 4 is a graphical representation of the nitrogen adsorption-desorption isotherm of granular activated carbon (SRD08017), according to an embodiment.
Figure 5:
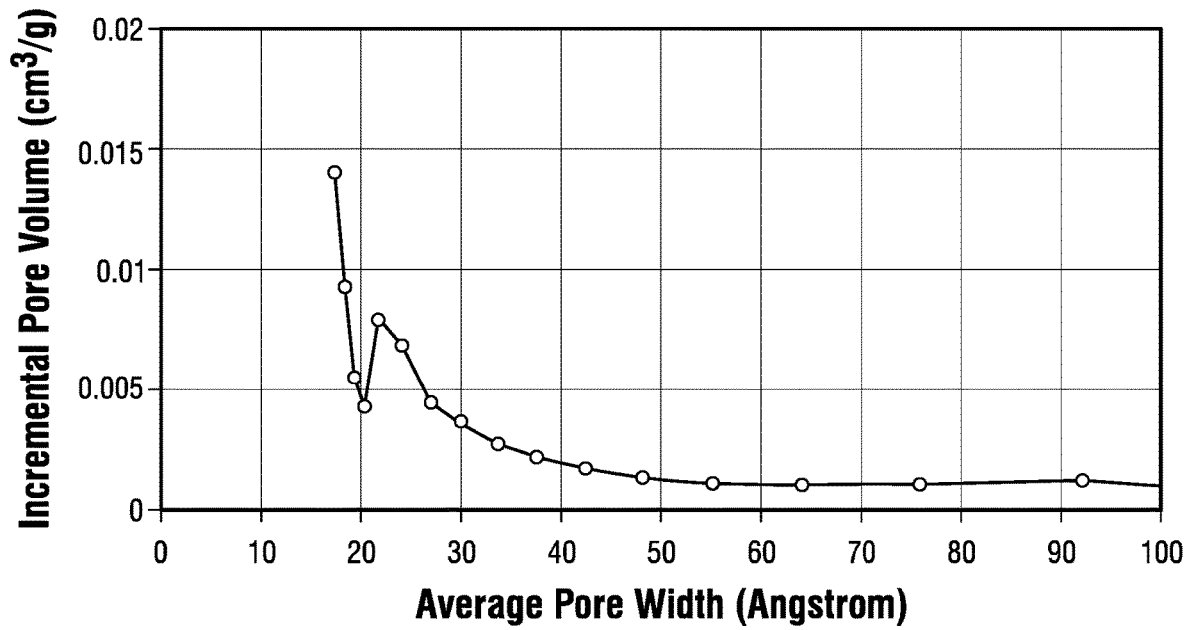
FIG. 5 is a graphical representation of pore size distribution of granular activated carbon (SRD08017), according to an embodiment.

An ANG system was developed with granular activated carbon (SRD08017 from Chemviron) without binding as the adsorber for the methane storage. Its physical properties are listed in Table 2, its nitrogen adsorption isotherm at 77 K is in FIG. 4, and pore size distribution is shown in FIG. 5.

TABLE 2

Physical properties of the granular activated carbon (SRD08017).

| Property | Value |
|---|---|
| BET Surface Area: | 1426 m²/g |
| Total pore volume | 0.599 cm³/g |
| Micropore volume | 0.560 cm³/g |
| Adsorption average pore width | 17.47 Å |
| ASTM mesh size | 2 × 60 |
| Bulk density (g/cm³) | 0.49 |
| Skeletal density (g/cm³) | 2.402 |

Granular activated carbon has large percent of micropore volume (0.56/0.599=93.5%) and its average pore width is in the micropore range, closing to the optimized pore width for methane storage, therefore, it is a suitable activated carbon for methane in ANG main adsorber.

Figure 6:
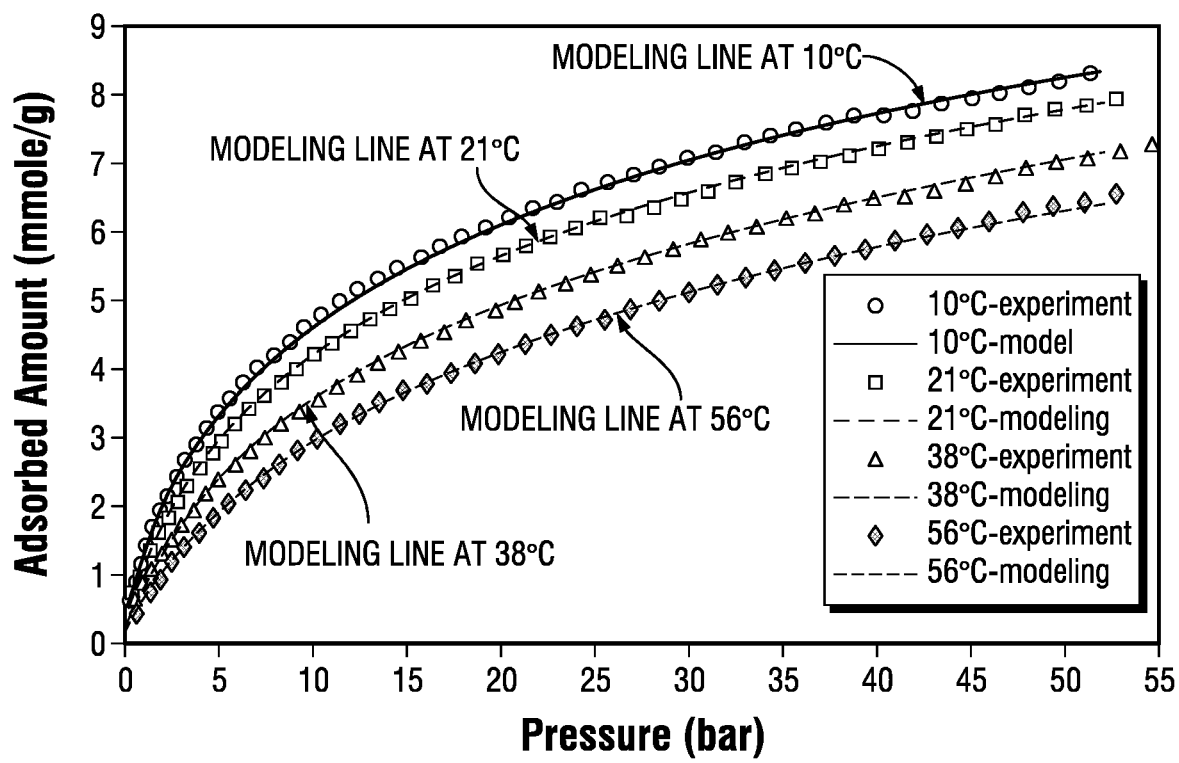
FIG. 6 is a graphical representation of the methane adsorption isotherm of granular activated carbon (SRD08017), according to an embodiment.

FIG. 6 is a graphical representation of the methane adsorption on SRD08017. The methane adsorption isotherms were collected at four different temperatures of 10° C., 21° C., 38° C., and 56° C. The Toth empirical isotherm model was used and nonlinear least square method was used to optimize the parameters for the temperature dependent Toth isotherm model for activated carbon SRD08017. At higher temperatures, lesser amount of natural gas is adsorbed, therefore, diurnal temperature change can aid the release of natural gas at day time in the summer, when the temperature can increase to greater than 35° C. or above. The parameters for this Toth model for activated carbon SRD08017 regarding methane adsorption is presented in Table 3.

TABLE 3

| Equation Name | Equation Expression | Optimized Parameters using 294.15 K as reference temperature | ARE (%) |
|---|---|---|---|
| Toth | $C_\mu = C_{\mu s,0} \dfrac{bP}{[1+(bp)^t]^{1/t}}$ <br><br> $b = b_0 \exp\left[\dfrac{Q}{RT_0}\left(\dfrac{T_0}{T}-1\right)\right]$ <br><br> $t = t_0 + \alpha\left(1 - \dfrac{T_0}{T}\right)$ <br><br> $C_{\mu s} = C_{\mu s,0}\exp\left[\chi\left(1 - \dfrac{T}{T_0}\right)\right]$ | $C_{\mu s,0}$ = 17.934 mmole/g <br> $\chi$ = 0 <br> $b_0$ = 0.12929 bar$^{-1}$ <br> Q = 20.259 kJ/mole <br> $t_0$ = 0.42718 <br> $\alpha$ = 0.2573 | 1.3047 |

The average relative error is defined in Equation (4), (Equation 4)

$$\text{Average relative error}(ARE)\ \% = \dfrac{\sum \left|\dfrac{Y_i^{exp} - Y_i^{modeled}}{Y_i^{exp}}\right|}{N}$$

Where N is the number of experimental data points, superscripts exp and modeled stand for the experimental and modeled values respectively, Y represents the amount of methane adsorbed.

The stored amount of methane inside a vessel includes the amount of methane adsorbed on the surface of the adsorbent—the activated carbon SRD08017, and compressed methane gas in the pores of the activated carbon and that compressed among void of granular activated carbons. FIG. 7 is a graphical representation of the stored amount by adsorption (ANG amount) and storage by only compression (CNG amount) without adsorbent. The ANG amount is about 2.5 times of that of CNG at 10° C. and 50 bars.

EXAMPLE 4

Adsorption Heat Modeling for Cooling Duty

The knowledge of the adsorption equilibrium and isosteric heat of adsorption is essential for proper design and operation of any gas-phase adsorption process. The isosteric heat of adsorption is usually estimated from the temperature dependence of the adsorption isotherm. Activated carbon has similar range of isosteric heat of adsorption, 15 to 20 KJ/mole, fundamentally it is due to the interaction of carbon atoms with methane molecules during adsorption. ZTC, with higher bulk density, has higher volume to volume adsorption capacity. Using Clausius-Clapeyron equation, Equation (5), the equation for isosteric heat of adsorption is derived from Toth equation as shown in Table 3.

(Equation 5)

$$-\Delta H = RT^2(\partial \ln P / \partial T)_\theta$$

$$-\Delta H = Q - \dfrac{1}{t}(\alpha RT_0)\left\{\ln(bP) - [1 + (bP)^t]\ln\left[\dfrac{bP}{(1+(bP)^t)^{1/t}}\right]\right\} =$$

-continued $$Q - \dfrac{1}{t}(\alpha RT_0)\left\{\ln\left[\dfrac{\theta}{(1-\theta^t)^{1/t}}\right] - \dfrac{\ln\theta}{(1-\theta^t)}\right\} =$$

$$Q - \dfrac{1}{t}(\alpha RT_0)\left\{\ln\left[\dfrac{C_\mu}{(C_{\mu s}^t - C_\mu^t)^{1/t}}\right] - \dfrac{\ln(C_\mu/C_{\mu s})}{(1-(C_\mu/C_{\mu s})^t)}\right\}$$

Figure 8:
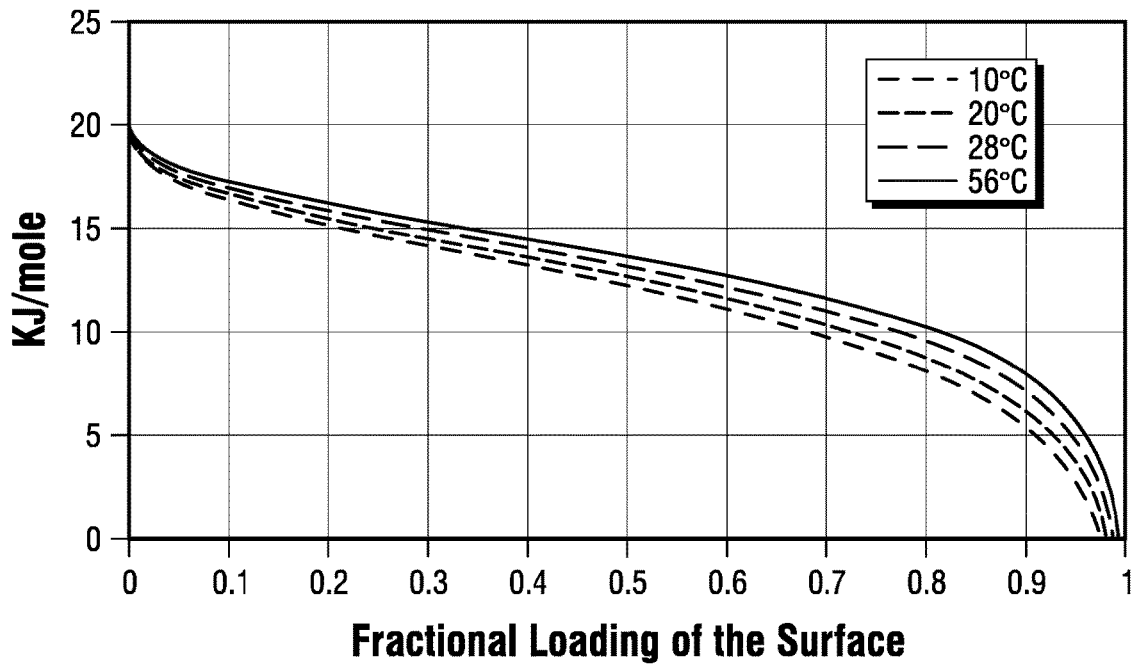
FIG. 8 is a graphical representation of the variation of the isosteric heat of adsorption for activated carbon (SRD08017) with loading at four different temperatures, according to an embodiment.

The isosteric heat of adsorption, Equation (5), is a function of loading of adsorbates or pressure. The parameter Q in Equation (5) is the isosteric heat when the fractional loading is zero. FIG. 8 is a graphical representation of the variation of the isosteric heat of adsorption for activated carbon (SRD08017) with loading at four different temperatures. The value of isosteric heat of adsorption determined by Equation (5) for activated carbon (SRD08017) is about 20 KJ/mole and aligns with the reported values in the literature. The decrease of the isosteric heat with loading physically means that methane molecules prefer to adsorb onto the sites of high energy. Then, as adsorption progresses methane molecules adsorb onto the sites of low energy, which results in a slow increase in the amount of adsorbed versus pressure. Equation (5) can be numerically integrated to get the integral heat of adsorption, which is the total amount of heat of adsorption released during the adsorption process. Assuming a constant bed temperature, the integral heat of adsorption heat released is calculated for an adsorber packed with 1 kg of activated carbon SRD08017 at a temperature range of 10-60° C. and a pressure range of 0-50 bars.

Figure 9:
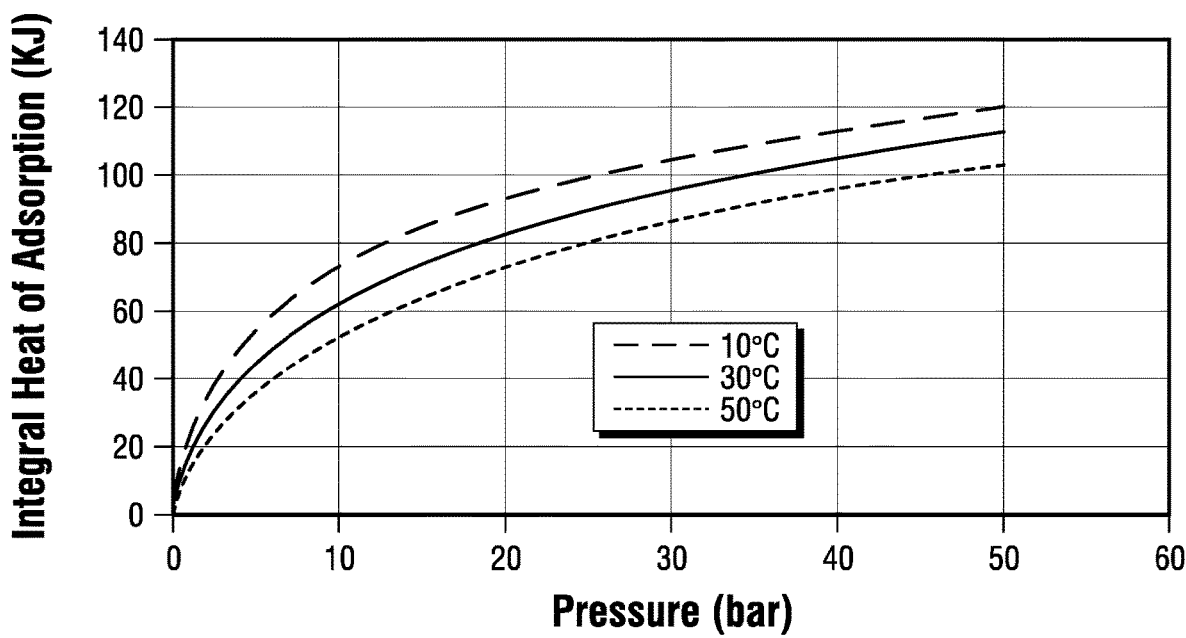
FIG. 9 is a graphical representation of the integral heat of adsorption released by the methane adsorption process at different pressures and temperatures, according to an embodiment.

FIG. 9 is a graphical representation of the integral heat of adsorption released for methane adsorption process at different pressure and temperature. Although FIG. 8 shows that isosteric heat is slightly higher at higher adsorption temperature, FIG. 9 shows the integral heat of adsorption released at higher temperature is less than that at lower temperature. This is because of the less amount of methane adsorbed at higher temperature.

EXAMPLE 5

Cooling Duty for Gas Cooler During Charging Process for 3 MMSCF Storage Capacity Assuming four main absorbers are filled with activated carbon SRD08017, Toth isotherm model is used to calculate the amount of methane adsorbed at the 900 psig of pipeline pressure before the pressure control valve as in FIG. 1. Adsorber bed is kept at 10° C. during the charging process, the flow rate of charging is 9 MMSCFD as in Example 2. Table 4 lists the activated carbon SRD08017 weight, stored amount of gas at the pressure of 900 psig, and the total adsorption heat needs to remove to keep the bed temperature at 10° C.

TABLE 4

| | |
|---|---:|
| Activated carbon SRD08017 weight (kg) | 227505 |
| Methane Stored (MMSCF) | 3 |
| Adsorption Heat (MMBTU) | 26.4 |
| Charge time (hours) | 7.93 |
| Cooling Duty (MMBTU/hour) | 3.33 |

EXAMPLE 6

Simulation of Discharging Process

A typical pipeline natural gas composition is presented in Table 5. This gas is used in the simulation of the compressor and the gas cooler in the discharging process.

TABLE 5

| Components | Mole Fraction |
|---|---:|
| Nitrogen | 0.07 |
| CO2 | 0.0036 |
| Methane | 0.8868 |
| Ethane | 0.0323 |
| Propane | 0.0049 |
| Iso-Butane | 0.0006 |
| n-Butane | 0.001 |
| Iso-Pentane | 0.0003 |
| n-Pentane | 0.0002 |
| n-Hexane | 0.0002 |
| n-Heptane | 0.0001 |
| n-Octane | 0.0001 |

The final pressure of the main adsorbers is 1 atm and temperature is 40° C. At this pressure and temperature, with the amount of natural gas charged into the main adsorber being 0.38 MMSCF, after discharging, the amount of gas remaining in the adsorbers is 0.024 MMSCF. This indicates about 93.6% of the stored gas can be discharged, and about 6% remained inside the adsorbers as baseload gas. Discharging time was assumed to be 6 hours (a typical summer peak demanding time), then the discharging flow rate is 0.059 MMSCF/hour.

The Aspen HYSYS® 9.0 software was used to simulate the compressing and cooling process. The discharged natural gas is discharged at 1 atm pressure at 104° F. and compressed to 400 psia (this is the typical inlet pressure for natural gas power plant, lower pressure side downstream of the pressure control valve in FIG. 1). The materials and energy streams of the simulation is in Table 6.

TABLE 6

Materials Streams

| Name | From Adsorbers | To Cooler | To Power Generator |
|---|---:|---:|---:|
| Vapor Fraction | 1.00 | 1.00 | 1.00 |
| Temperature [F.] | 104.00 | 739.53 | 104.00 |
| Pressure [psia] | 14.70 | 400.00 | 400.00 |
| Molar Flow [MMSCFD] | 9.08 | 9.08 | 9.08 |

Energy Streams

| Name | Compressor Duty | Cooler Duty |
|---|---:|---:|
| Heat Flow [MMBtu/hr] | 6.99 | 7.18 |

EXAMPLE 7

Saving Estimation

Using 3000 MMBTU as the total heating value of discharged natural gas in the amount of 3 MMSCF (assuming heating value of natural gas is 1000 BTU/SCF), 1 gallon of diesel has heating value of 0.139 MMBTU, 1 barrel has 42 gallons, replacing 3000 MMBTU of diesel with natural gas can be cost effective, as shown in Table 7.

The yearly savings calculation assumes that the mobile facility is used to transport natural gas to locations to replace diesel for power generation for 120 days a year in the summer time. Therefore, the economic advantage of the mobile ANG facility is as presented in Table 7 and will also help to protect the environment by availing of the natural gas as the fuel for power generation to reduce $CO_2$ and emissions of particulate matters.

TABLE 7

| Year | Diesel for Power (0.05%) $/BBL | Diesel for Power (0.05%) HL/Ltr | Diesel for Power (0.05%) $/MMBTU | Sales Gas $/MMBTU | Cost of Diesel for 3000 MMBTU ($) | Cost of Natural Gas for 3000 MMBTU ($) | Yearly Savings ($ MM) |
|---|---:|---:|---:|---:|---:|---:|---:|
| 2016 | 40.7 | 96.1 | 7.1 | 4.1 | 20924.34 | 12235 | 1.04 |
| 2017 | 40.8 | 96.2 | 7.1 | 4.6 | 20962.3 | 13703.1 | 0.87 |
| 2018 | 41.8 | 98.6 | 7.3 | 4.9 | 21478.9 | 14845.3 | 0.79 |

TABLE 7-continued

| Year | Diesel for Power (0.05%) $/BBL | Diesel for Power (0.05%) HL/Ltr | Diesel for Power (0.05%) $/MMBTU | Sales Gas $/MMBTU | Cost of Diesel for 3000 MMBTU ($) | Cost of Natural Gas for 3000 MMBTU ($) | Yearly Savings ($ MM) |
|---|---|---|---|---|---|---|---|
| 2019 | 44 | 103.7 | 7.7 | 5.3 | 22592.9 | 15987.5 | 0.79 |
| 2020 | 47.2 | 111.4 | 8.2 | 5.7 | 24261.6 | 17129.6 | 0.85 |
| 2021 | 51.6 | 121.7 | 9 | 6.2 | 26521.5 | 18494 | 0.96 |
| 2022 | 56.9 | 134.1 | 9.9 | 6.5 | 29219.4 | 19538.9 | 1.16 |
| 2023 | 62.9 | 148.3 | 11 | 6.8 | 32306.2 | 20462.1 | 1.42 |
| 2024 | 69.1 | 163.1 | 12.1 | 7.1 | 35523.6 | 21289.3 | 1.7 |
| 2025 | 75.4 | 177.8 | 13.2 | 7.3 | 38725.3 | 22038.9 | 2 |
| 2026 | 81.8 | 192.9 | 14.3 | 7.6 | 42033.1 | 22724.6 | 2.31 |
| 2027 | 88.5 | 208.7 | 15.4 | 7.8 | 45456.7 | 23356.5 | 2.65 |
| 2028 | 95.7 | 225.7 | 16.7 | 8 | 49166.4 | 23942.7 | 3.02 |
| 2029 | 103.3 | 243.6 | 18 | 8.2 | 53058.3 | 24489.5 | 3.43 |
| 2030 | 111.5 | 263 | 19.5 | 8.3 | 57303.9 | 25002.1 | 3.88 |
| 2031 | 120.4 | 284 | 21 | 8.5 | 61864.2 | 25484.7 | 4.36 |
| 2032 | 130.1 | 306.8 | 22.7 | 8.6 | 66837.7 | 25940.7 | 4.9 |
| 2033 | 140.5 | 331.5 | 24.5 | 8.8 | 72223.7 | 26373 | 5.5 |
| 2034 | 151.6 | 357.7 | 26.5 | 8.9 | 77929.1 | 26784.1 | 6.14 |
| 2035 | 163.9 | 386.7 | 28.6 | 9.1 | 84249.6 | 27176.1 | 6.84 |
| 2036 | 177.4 | 418.6 | 31 | 9.2 | 91183.5 | 27550.86 | 7.63 |
| 2037 | 182.8 | 431.2 | 31.9 | 9.3 | 93925.4 | 27909.8 | 7.92 |
| 2038 | 190.5 | 449.3 | 33.3 | 9.4 | 97884.2 | 28254.5 | 8.35 |
| 2039 | 196 | 462.4 | 34.2 | 9.5 | 100723.6 | 28586 | 8.65 |
| 2040 | 204 | 481.2 | 35.6 | 9.6 | 104824.7 | 28905.4 | 9.11 |

It should be understood that any two quantitative values assigned to a property may constitute a range of that property, and all combinations of ranges formed from all stated quantitative values of a given property are contemplated in this disclosure. Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Further, it will be apparent that modifications and variations are possible without departing from the scope of the appended claims.

What is claimed is:

1. A natural gas storage unit for reducing effects of fluctuating demand on natural gas, the natural gas storage facility comprising:
   an adsorbed natural gas storage unit containing carbon-based adsorbents including polyvinyl alcohol-bonded pellets of zeolite templated carbon;
   a temperature control system coupled to the adsorbed natural gas storage unit to regulate temperature of the adsorbed natural gas storage unit; and
   a compressor system coupled to the adsorbed natural gas storage unit to regulate pressure of the adsorbed natural gas storage unit.

2. The natural gas storage unit of claim 1, wherein the carbon-based adsorbent comprises granular activated carbon.

3. The natural gas storage unit of claim 1, wherein the carbon-based adsorbent comprises pelletized activated carbon.

4. The natural gas storage unit of claim 1, wherein the carbon-based adsorbent consists essentially of pelletized zeolite templated carbon.

5. The natural gas storage unit of claim 1, wherein the carbon-based adsorbent consists of polyvinyl alcohol-bonded pellets of zeolite templated carbon.

6. A gas storage apparatus to transport a gas, the gas storage apparatus comprising:
   an adsorbent composition containing zeolite templated carbon pellets including polyvinyl alcohol-bonded pellets of zeolite templated carbon.

7. The gas storage apparatus of claim 6, wherein the adsorbent composition consists of polyvinyl alcohol-bonded pellets of zeolite templated carbon.

8. The gas storage apparatus of claim 6, wherein the adsorbent composition containing the polyvinyl alcohol-bonded pellet of the zeolite templated carbon has a pellet density greater than 0.6 grams per cubic centimeters and mechanical compressive strength greater than 10 megapascals.

9. The gas storage apparatus of claim 6, wherein the gas is methane.

10. The gas storage apparatus of claim 6, wherein the gas is natural gas.

* * * * *